Nov. 24, 1931.    S. D. ROBINS    1,833,179
TROUGHING IDLER FOR CONVEYER BELTS
Filed July 9, 1930    2 Sheets-Sheet 1
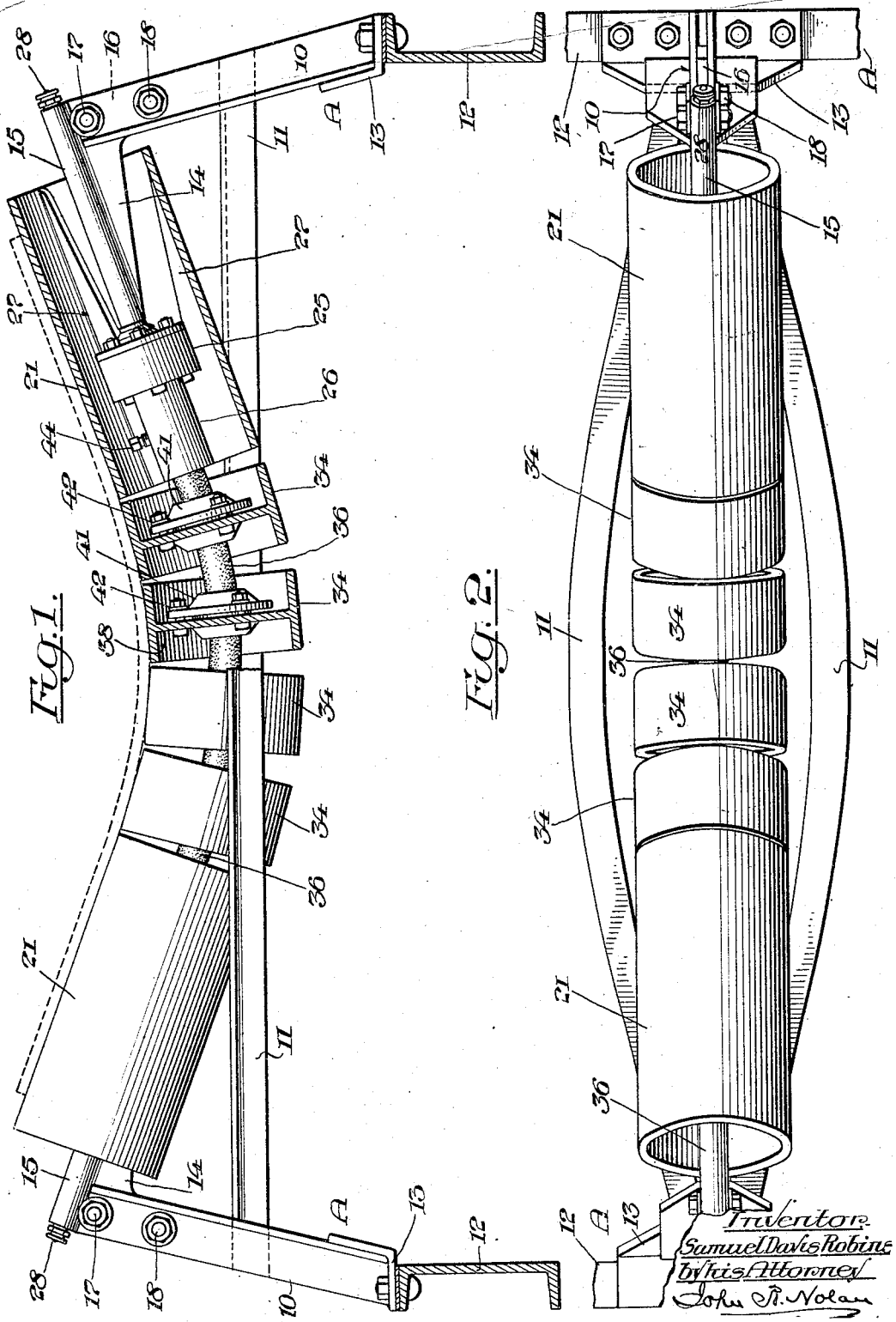

Nov. 24, 1931.　　S. D. ROBINS　　1,833,179
TROUGHING IDLER FOR CONVEYER BELTS
Filed July 9, 1930　　2 Sheets-Sheet 2
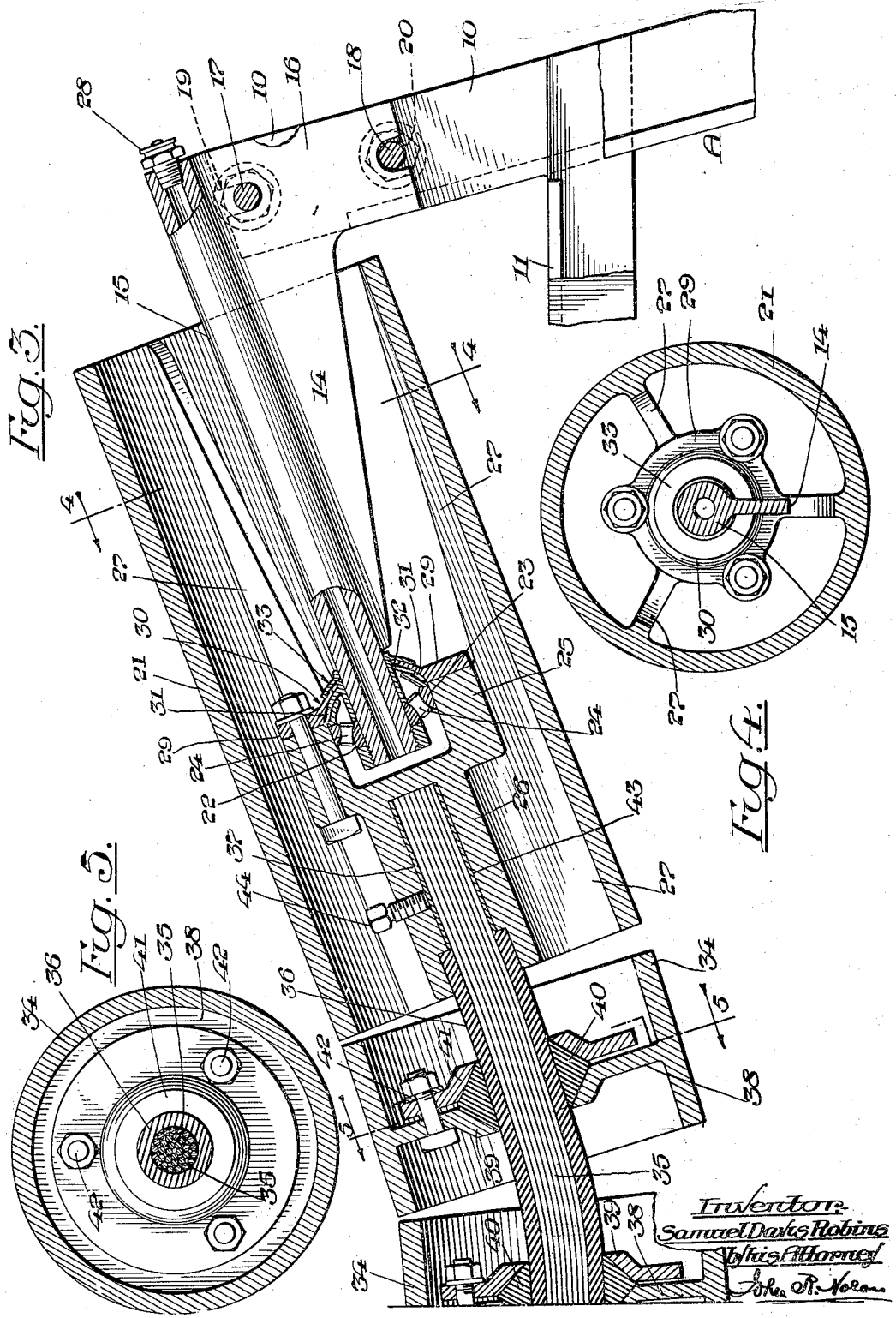

Patented Nov. 24, 1931

1,833,179

UNITED STATES PATENT OFFICE

SAMUEL DAVIS ROBINS, OF WOODMERE, NEW YORK, ASSIGNOR TO ROBINS CONVEYING BELT COMPANY, OF PASSAIC, NEW JERSEY, A CORPORATION OF NEW JERSEY

TROUGHING IDLER FOR CONVEYER BELTS

Application filed July 9, 1930. Serial No. 466,674.

This invention relates to troughing idlers for conveyer belts.

The principal object of the invention is to provide a simple and efficient construction embodying a plurality of pulleys which are so assembled and mounted that they automatically assume a troughing position and are effective to impart a uniform transverse curvature to the upper run of a conveyer belt supported thereon, irrespective of the direction of travel of the belt.

Another object of the invention is to provide such a construction wherein the end pulleys are mounted on beam supports and the intermediate pulleys on a flexible suspension medium, axially connected to the end pulleys, whereby a large proportion of the belt load is carried on the said supports and a relatively small load by the flexible suspension medium, thus permitting the use of a unitary suspension medium, such, for example, as a core of closely assembled rubber-treated strands of cord having a protective cover of rubber.

Another object of the invention is to provide such a construction wherein self-aligning roller bearings for the end pulleys may be employed, thus enabling part of the load on each end pulley to be carried in thrust and the other part in radial load on the adjacent bearing.

Another object of the invention is to provide a novel arrangement of housings for the bearings of the end pulleys, and means whereby a lubricant for the bearings can be readily supplied to the housings.

Another object of the invention is to provide simple and efficient sealing means for the said housings.

Another object of the invention is to provide a simple and inexpensive, yet rigid and substantial, idler stand, in which the pulleys and their mountings are supported, which stand is so constructed that spillage from the belts into the end pulleys passes through the latter and escapes below the stand.

With these and other objects in view the invention comprises features of novelty which, in a preferred embodiment of the invention, will be hereinafter described; the scope of the invention being defined in the appended claims.

In the drawings—

Figure 1 is a sectional elevation of an idler structure embodying my invention, the conveyer belt being indicated by dotted lines.

Fig. 2 is a plan of the structure.

Fig. 3 is a longitudinal vertical section, on a larger scale, through one of the end pulleys and the adjacent intermediate pulleys, showing a cantilever support and bearing for the end pulley, and a portion of the flexible suspension member for the intermediate pulleys.

Figs. 4 and 5 are transverse vertical sections, as on the lines 4—4 and 5—5 of Fig. 3, respectively.

Referring to the drawings, A designates an idler stand comprising spaced up-standing brackets 10 rigidly connected by laterally-disposed outwardly-bowed tie bars 11 and firmly supported upon the parallel stringers 12 of a belt conveyer apparatus.

In the present instance each of the brackets comprises a pair of L-members arranged in spaced parallel relation, and a substantial L-base 13 to which the members are welded.

Fixed on the principle of cantilevers on the upper ends of the respective brackets 10 are pulley supporting structures which incline inwardly and downwardly from the brackets, each of said structures comprising a tapering flat beam 14 and a hollow shaft 15 which is welded or otherwise permanently secured to and longitudinally of the upper edge of the beam. Each beam 14 is formed at its outer end with an enlarged portion 16 which is interposed between the upper portions of the adjacent paired bracket members and is firmly secured in place by upper and lower crossbolts 17, 18, respectively. The upper bolt holes 19 in the bracket members are elongated to the upper ends of the bracket members, and the lower bolt holes 20 in the enlarged beam portion are elongated to the lower end of such portion, thus facilitating the mounting and removal of the supporting structure, and its adjuncts, when the bolt nuts are slackened.

The inner end of each of the shafts 15 extends beyond the adjacent end of the associated beam 14 and carries a bearing for an inclined end pulley 21, which bearing is positioned within the pulley, preferably between the middle and the inner end of the pulley, as shown.

The bearing herein illustrated is of the self-aligning roller type, comprising two complementary race or annular flange members 22, 23 with interposed rollers 24. The race member 22 is fast on the shaft 15 and the member 23 is fast on the inner peripheral wall of a housing 25 on the outer end of the pulley hub 26. This hub extends from the housing to the inner end of the pulley, or substantially so, and is supported throughout its length by radial webs 27 which preferably extend from end to end of the pulley, the portions of the webs between the hub and the outer end of the pulley being inclined, as shown, to afford sufficient clearance between them and the adjacent stationary beam 14.

The housing 25 constitutes a lubricant chamber for the bearing, which chamber may be supplied with lubricant introduced in the associated hollow shaft 15 at the outer end of the latter, such end having a suitable screw plug 28 or other closure.

The outer end of the housing is equipped with a seal to prevent the escape of the lubricant and also to exclude dust, etc., therefrom. In the present instance this seal includes a ring 29 which is firmly bolted to the housing, concentric with the shaft, and is provided with a centrally-disposed annularly-recessed spheroidal flange 30 into the recess 31 of which rotatively extends an annular gasket 32 fast on the shaft. A cap member 33 also fast on the shaft overlaps the outer face of the flange, thus affording, in conjunction with the flange and the gasket, an efficient labyrinth seal.

Axially secured to and rotatable with the hubs of the two inclined end pulleys 21 are the respective ends of a unitary suspension shaft which is flexible at all portions throughout its length and carries a series of intermediate short-face pulleys 34 in such manner that the shaft and its pulleys naturally assume a position approximating a catenary curve as all portions of the shaft between pulleys are flexible. Hence the assembled pulleys 21, 34 automatically adapt themselves to a belt-aligning troughing position irrespective of the direction of travel of the conveyer belt, to which condition the end pulleys materially contribute by virtue of the bearing construction described.

Preferably the flexible suspension shaft is composed of longitudinally assembled strands of cord 35 treated with a thin coat of rubber and rolled into a compact core, which core is given an outside protective coating 36 of rubber and is then vulcanized in a suitable mold. The rubber coating terminates inwardly of the ends of the core, and metal protective ferrules 37 are affixed to the uncoated portions of the core.

A simple and efficient manner of securing the pulleys 34 to the flexible shaft is illustrated. As shown the central web 38 of each pulley is angularly shaped at its bore, as at 39, to receive and support a rubber bushing 40 of triangular cross-section, the base of which hugs the flexible shaft and is forced hard thereagainst by means of a clamp ring, or spreader, 41, which is adjustably secured to the web of the pulley by means of bolts 42.

When the pulleys 34 are assembled and centrally clamped on the flexible shaft, the ends of the latter are entered in the bores 43 of the respective pulley hubs 26 and are therein fixedly held in place by means, for example, of suitably-disposed screws 44 which engage the opposed ferrules 37.

From the foregoing it will be seen that the unitary flexible shaft carrying the intermediate juxtaposed pulleys is suspended from the inner ends of end pulleys which have their bearings supported at the inner ends of beams reaching well into the end pulleys, and that, therefore, a large proportion of the belt load is carried on the beams and a relatively small load by the flexible shaft. It will also be seen that the described bearing construction enables the use of a flexible shaft of rubber-protected fibrous material, instead of expensive articulated metal members, which latter not only involve considerable machine work in their construction and assembly, but are also subject to deterioration due to rust and rapid wear when in actual service.

It will also be seen that the said beam construction enables the use of self-aligning roller bearings for the end pulleys, with the result that part of the load on each end pulley is carried in thrust and the other part in radial load on the associated bearing. Hence all the rollers of each bearing are brought into action, thus enabling the use of a smaller bearing than would be the case if all the load were put on the bearing, either in the form of thrust or radial load.

It will also be seen that the described axial mounting of a series of short-face intermediate pulleys on the flexible suspension shaft enables the pulleys to adapt themselves to the curvature of the flexible shaft and thus present a uniform bearing surface to the troughed conveyer belt irrespective of the direction of travel of the belt.

Moreover, it will be seen that my invention provides an open or skeleton idler stand of rigid and substantial construction through which material, such as sand or gravel, that may be spilled from the belt into the upper ends of the end pulleys, will pass freely down through the pulleys and thence below the stand, thus obviating any liability of spillage accumulations within the stand.

It is to be understood that my invention is not limited to the specific form of embodiment thereof herein disclosed, as the structure may be modified within the principle of the invention and the scope of the appended claims.

I claim—

1. A belt-troughing idler structure having spaced brackets, fixed supports for suspension pulley bearings extending inwardly from the brackets, end pulleys encircling said supports and mounted on said bearings and suspended from the bearings, a single flexible suspension medium having its ends secured to the respective end pulleys inwardly of the bearings and co-axial with said pulleys, and intermediate pulleys fixedly carried by said suspension medium.

2. A belt-troughing idler structure having spaced brackets, supports extending inwardly from the brackets, end pulley encircling said supports, self-aligning roller bearings between said pulleys and the inner portions of the said supports, a flexible suspension medium having its ends secured to the respective end pulleys inwardly of the bearings and co-axial with said pulleys, and intermediate pulleys carried by said suspension medium.

3. A belt-troughing idler structure having spaced brackets, supports extending inwardly from the brackets, each of said supports comprising a beam affixed to the adjacent bracket, and a shaft extending longitudinally of and fixedly carried by the beam, end pulleys encircling said supports and rotatably suspended from the inner ends of the respective shafts, a single flexible suspension medium having its ends secured to the respective end pulleys, and intermediate pulleys fixedly carried by said suspension medium.

4. A belt-troughing idler structure having spaced brackets, supports extending inwardly from the brackets, each of said supports comprising a beam affixed to the adjacent bracket, and a shaft extending longitudinally of and carried by the beam, end pulleys encircling said supports, self-aligning roller bearings between said pulleys and the inner ends of the respective shafts, a flexible suspension medium having its ends secured to the respective end pulleys, and intermediate pulleys carried by said suspension medium.

5. A belt-troughing idler structure having spaced brackets, supports for pulley bearings extending inwardly from the brackets, end pulleys encircling said supports and mounted to rotate on said bearings, a flexible suspension medium comprising longitudinally assembled strands of fibrous material and a protective coating of rubber, said strands secured at their ends to the respective end pulleys, and intermediate pulleys carried by said suspension medium.

6. A belt-troughing idler structure having spaced brackets, supports for pulley bearings extending inwardly from the brackets, end pulleys encircling said supports and mounted on said bearings, a flexible suspension medium comprising longitudinally assembled strands of fibrous material and a protective coating of rubber, said medium secured at its ends to the respective end pulleys, intermediate pulleys, and means for securing each of the latter pulleys to the suspension medium, said means including a central rubber bushing on the pulley, and a clamping member for said bushing.

7. A belt-troughing idler structure having spaced brackets, pulley supports extending inwardly from the brackets, end pulleys encircling said supports, bearings between said pulleys and the inner ends of the respective supports, said pulleys having centrally bored portions between said bearings and the inner ends of the respective pulleys, a single flexible suspension medium between the inner ends of the pulleys, said medium having its ends extended into and secured to the respective centrally bored portions of the said pulleys, and intermediate pulleys fixedly carried by said suspension medium.

8. A belt-troughing idler structure having an up-standing bracket comprising a pair of standards arranged in spaced relation, a cantilever beam having its supported end fixedly mounted in and between said standards, a shaft fixed on said beam, and a pulley encircling said beam and shaft and rotatably suspended from the inner end of the shaft.

9. A belt-troughing idler structure having a pair of inwardly and downwardly inclined end pulleys, bearing supports for said pulleys, a unitary flexible suspension medium axially secured to the inner ends of the respective end pulleys, and intermediate pulleys fast on said suspension medium.

10. A belt-troughing idler structure having a pair of inwardly and downwardly inclined end pulleys, bearing supports for said pulleys, a unitary flexible suspension medium axially secured to the inner ends of the respective end pulleys, said medium comprising longitudinally assembled strands of fibrous material having a protective coating of rubber, and intermediate pulleys fast on said suspension medium.

11. A belt-troughing idler structure having a pair of inwardly and downwardly inclined end pulleys, bearing supports for said pulleys, a unitary flexible suspension medium secured to the inner ends of the respective end pulleys, said medium comprising a rolled core of rubber-treated longitudinally-assembled strands of fibrous material having a protective coating of rubber, and intermediate pulleys fast on said suspension medium.

12. A belt-troughing idler structure having a cantilever beam, a shaft supported on and longitudinally of said beam, and a pulley having a housing encircling said shaft and having a suspension bearing within the housing formed of an annular flange at the inner end of the shaft, and an annular flange in the housing between the outer end of the housing and the flange on the end of the shaft.

13. A belt-troughing idler structure having a flexible suspension medium and a plurality of juxtaposed pulleys fast thereon, said suspension medium comprising a roll of longitudinally assembled strands of fibrous material and a protective coating of rubber.

14. A belt-troughing idler structure having end pulleys, a flexible suspension medium fixedly connected at one end to each of said end pulleys, a plurality of juxtaposed pulleys thereon between the end pulleys, and means for securing each of the intermediate pulleys to the suspension medium.

15. A belt-troughing idler structure having a flexible suspension medium, a plurality of juxtaposed pulleys thereon, each having a centrally disposed bushing seat intermediate its ends, a rubber bushing encircling the shaft and bearing against the said seat, and a clamping member for said bushing.

16. A belt-troughing idler structure having two up-standing supporting brackets, each comprising a pair of standards arranged in spaced relation, laterally-disposed outwardly-bowed tie bars rigidly connecting said standards, cantilever beams extending inwardly from and having their outer ends mounted in and between said standards, shafts fixed on the respective beams, and pulleys encircling said beams and shafts and rotatably mounted on the inner ends of the respective shafts.

17. A belt-troughing idler structure having a pair of inwardly and downwardly inclined end pulleys, bearing supports for said pulleys, a unitary suspension member flexible at all portions and axially secured to the inner ends of the respective end pulleys, and intermediate pulleys fast on said suspension means.

Signed at New York, in the county and State of New York this twenty seventh day of June A. D. 1930.

SAMUEL DAVIS ROBINS.